(12) United States Patent
Ito (10) Patent No.: US 9,798,699 B2
(45) Date of Patent: Oct. 24, 2017

(54) APPARATUS AND METHOD FOR SYSTEM ERROR MONITORING

(71) Applicant: FUJITSU LIMITED, Kawasaki-shi, Kanagawa (JP)

(72) Inventor: Toshio Ito, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 140 days.

(21) Appl. No.: 14/526,891

(22) Filed: Oct. 29, 2014

(65) Prior Publication Data

US 2015/0178245 A1 Jun. 25, 2015

(30) Foreign Application Priority Data

Dec. 20, 2013 (JP) ................................ 2013-264613
Sep. 17, 2014 (JP) ................................ 2014-189103

(51) Int. Cl.
*G06F 17/12* (2006.01)
*G06F 17/13* (2006.01)
(Continued)

(52) U.S. Cl.
CPC ............. *G06F 17/12* (2013.01); *G06F 17/13* (2013.01); *G06F 17/141* (2013.01); *G06F 17/17* (2013.01); *G06K 9/00503* (2013.01); *G07C 5/008* (2013.01); *G07C 5/0808* (2013.01); *G06K 9/00805* (2013.01)

(58) Field of Classification Search
CPC ..................... G06F 17/12; G06F 17/13; G06F 17/17–17/18
See application file for complete search history.

(56) References Cited

U.S. PATENT DOCUMENTS

| 9,015,095 | B2* | 4/2015 | Ito ........................ G06N 3/049 706/30 |
| 2010/0198897 | A1* | 8/2010 | Yarman ................. G06F 17/17 708/270 |
| 2013/0268473 | A1 | 10/2013 | Ito |

FOREIGN PATENT DOCUMENTS

| JP | 2000-182552 | 6/2000 |
| JP | 2001-208842 | 8/2001 |

(Continued)

OTHER PUBLICATIONS

B. Kaufmann, "Fitting a sum of exponentials to numerical data," 2003.*
G. Hooker, "Functional Data Analysis: A Short Course", handout from 2010 International Workshop on Statistical Modeling, Glasgow University, 2010, retrieved from http://faculty.bscb.cornell.edu/~hooker/ShortCourseHandout.pdf.*
Extended European Search Report issued Nov. 10, 2015 in Patent Application No. 14191085.1.
(Continued)

*Primary Examiner* — Matthew Sandifer
(74) *Attorney, Agent, or Firm* — Oblon, McClelland, Maier & Neustadt, L.L.P.

(57) ABSTRACT

An information processing method for system identification includes: generating a fitting curve represented by a sum of exponential functions for each of a set of digital inputs and a set of digital outputs for a physical system that is represented by one or plural equations including m-order differential operators (m is an integer equal to or greater than 1); and calculating coefficients of the differential operators, which are included in first coefficients, so that a first coefficient of each exponential function included in an expression obtained by a product of the differential operators and the fitting curve for the set of the digital inputs is equal to a second coefficient of the same exponential function, which is included in the fitting curve for the set of the digital outputs.

9 Claims, 7 Drawing Sheets (51) Int. Cl.
    *G06F 17/17*    (2006.01)
    *G06F 17/14*    (2006.01)
    *G07C 5/00*     (2006.01)
    *G07C 5/08*     (2006.01)
    *G06K 9/00*     (2006.01)

(56) References Cited

FOREIGN PATENT DOCUMENTS

| | | |
|---|---|---|
| JP | 2003-108542 | 4/2003 |
| JP | 2007-286801 | 11/2007 |
| JP | 2010-264499 | 11/2010 |
| JP | 2013-175143 | 9/2013 |
| KR | 10-2004-0092372 A | 11/2004 |
| KR | 10-2007-0108294 A | 11/2007 |

OTHER PUBLICATIONS

A. A. Poyton et al., "Parameter Estimation in Continuous-Time Dynamic Models Using Principal Differential Analysis". Computers & Chemical Engineering, vol. 30, No. 4, XP027942814, Feb. 15, 2006, pp. 698-708.

W. Y. Yang et al., "Chapter 3: Interpolation and Curve Fitting", Applied Numerical Methods Using MATLAB, XP055225091, Jan. 27, 2005, pp. 117-177.

Toshio Ito et al. "Analyzing Bilinear Neural Networks with New Curve Fitting for Application to Human Motion Analysis", IEEE International Conference on Systems, Man, and Cybernetics, 2012, 8 pages.

Office Action issued Oct. 16, 2015 in Korean Patent Application No. 10-2014-0166258 (with English language translation).

\* cited by examiner

APPARATUS AND METHOD FOR SYSTEM ERROR MONITORING

CROSS-REFERENCE TO RELATED APPLICATIONS

This application is based upon and claims the benefit of priority of the prior Japanese Patent Application No. 2013-264613, filed on Dec. 20, 2013, and the Japanese Patent Application No. 2014-189103, filed on Sep. 17, 2014, the entire contents of which are incorporated herein by reference.

FIELD

This invention relates to a system identification technique.

BACKGROUND

Figure 1:
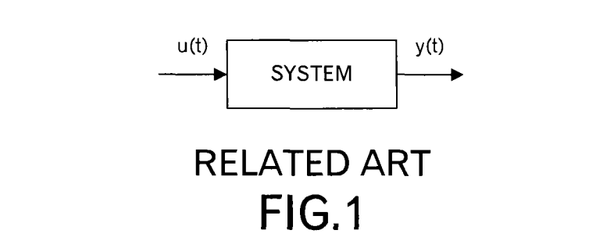
FIG. 1 is a diagram schematically depicting a system of analog inputs and outputs.

In a field such as an automatic control, there is an issue of identification of a linear system. For example, when an analogue input u(t) and an analogue output y(t) are given with respect to a physical system, which is represented by a linear ordinary differential equation as illustrated in FIG. 1, a problem is to determine differential coefficients $P_1$ to $P_m$ of differential operators P(d/dt) so that the following relations hold.

$$P\left(\frac{d}{dt}\right) y(t) = u(t)$$

$$P\left(\frac{d}{dt}\right) = \left(\frac{d}{dt}\right)^m + P_1 \left(\frac{d}{dt}\right)^{m-1} + \ldots + P_{m-1}\left(\frac{d}{dt}\right) + P_m$$

In this patent application, a case where P(d/dt) y(t) is almost equal to u(t) is represented as P(d/dt)y(t) being equal to u(t).

Figure 2:
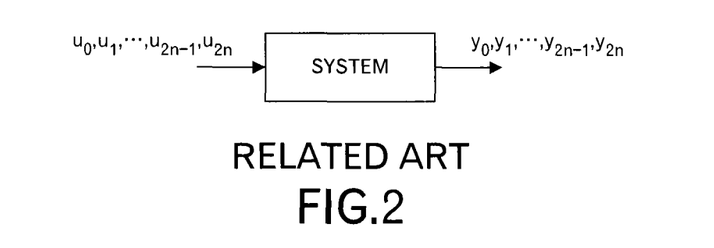
FIG. 2 is a diagram schematically depicting a system of digital inputs and outputs.

However, sensor values such as output values of an accelerometer, which is recently used, are digital values (i.e. discrete values) instead of analogue values. Therefore, as illustrated in FIG. 2, when digital inputs $u_0$, $u_1$, $u_{2n}$ and digital outputs $y_0$, $y_1$, . . . , $y_{2n}$ are given, a method for determining differential coefficients $P_1$ to $P_m$ of the differential operators P(d/dt) is considered so that the differential equation P(d/dt)y(t)=u(t) of the physical system, which is represented by the ordinary differential equation, holds.

Therefore, in order to realize this, the digital data is converted to the analogue data. As for that method, there is a fitting method. The spline method is a conventional famous fitting method, however, it has a problem that it is possible to differentiate the spline curve a few times, for example. Therefore, when order m of the differential operator is high, the spline method cannot be applied.

Moreover, even when another fitting method is adopted, it is not realistic in view of the calculation amount that the differential operations are calculated for all times, and it is not possible to identify the system that is represented by the differential equation including higher-order differential operators.

Patent Document 1: Japanese Laid-open Patent Publication No. 2013-175143
Patent Document 2: Japanese Laid-open Patent Publication No. 2010-264499
Patent Document 3: Japanese Laid-open Patent Publication No. 2000-182552
Patent Document 4: Japanese Laid-open Patent Publication No. 2003-108542
Patent Document 5: Japanese Laid-open Patent Publication No. 2007-286801
Patent Document 6: Japanese Laid-open Patent Publication No. 2001-208842
Non-Patent Document 1: T. Ito, Y. Senta and F. Nagashima, "Analyzing Bilinear Neural Networks with New Curve Fitting for Application to Human Motion Analysis", in Proc. IEEE Int. Conf. Systems, Man and Cybernetics, 2012, pp. 345-352

SUMMARY

An information processing method relating to this invention includes (A) generating a fitting curve represented by a sum of exponential functions for each of a set of digital inputs and a set of digital outputs for a physical system that is represented by one or plural equations including m-order differential operators (m is an integer equal to or greater than 1.) The set of the digital inputs and the set of the digital outputs are stored in a data storage unit; and (B) calculating coefficients of the differential operators, which are included in first coefficients, so that a first coefficient of each exponential function included in an expression obtained by a product of the differential operators and the fitting curve for the set of the digital inputs is equal to a second coefficient of the same exponential function, which is included in the fitting curve for the set of the digital outputs.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

DESCRIPTION OF EMBODIMENTS

Embodiment 1

Figure 3:
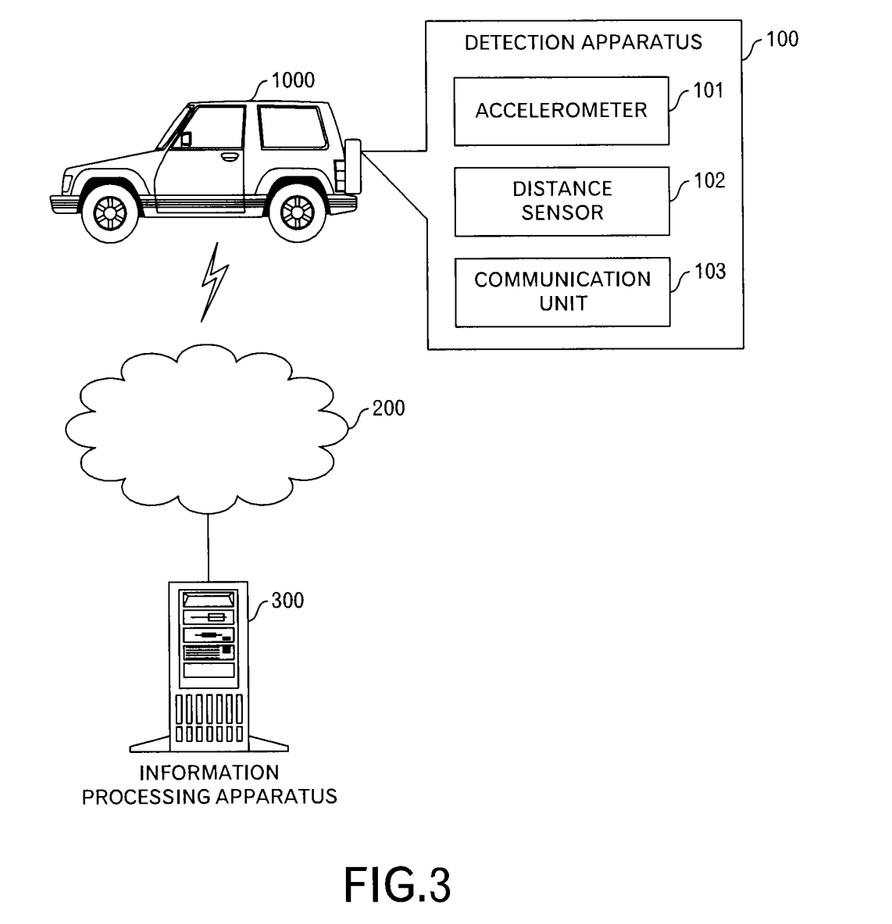
FIG. 3 is a diagram depicting an outline of a system relating to embodiments.

FIG. 3 illustrates an example of a system relating to this embodiment. For example, a detection apparatus 100 is provided in a vehicle 1000, and the detection apparatus 100 has an accelerometer 101 that measures acceleration of the vehicle 1000, a distance sensor 102 that measures a running distance of the vehicle 1000 and a communication unit 103.

The communication unit 103 of the detection apparatus 100 in the vehicle 1000 transmits measurement data to an information processing apparatus 300, for example, within a cloud, data center or the like through a network 200 such as the Internet. The vehicle 1000 is a physical system that is represented by differential equations including differential operators of m-order (m is an integer that is equal to or greater than 1) as illustrated in FIG. 2. Moreover, the vehicles 1000 may be plural instead of single.

Figure 4:
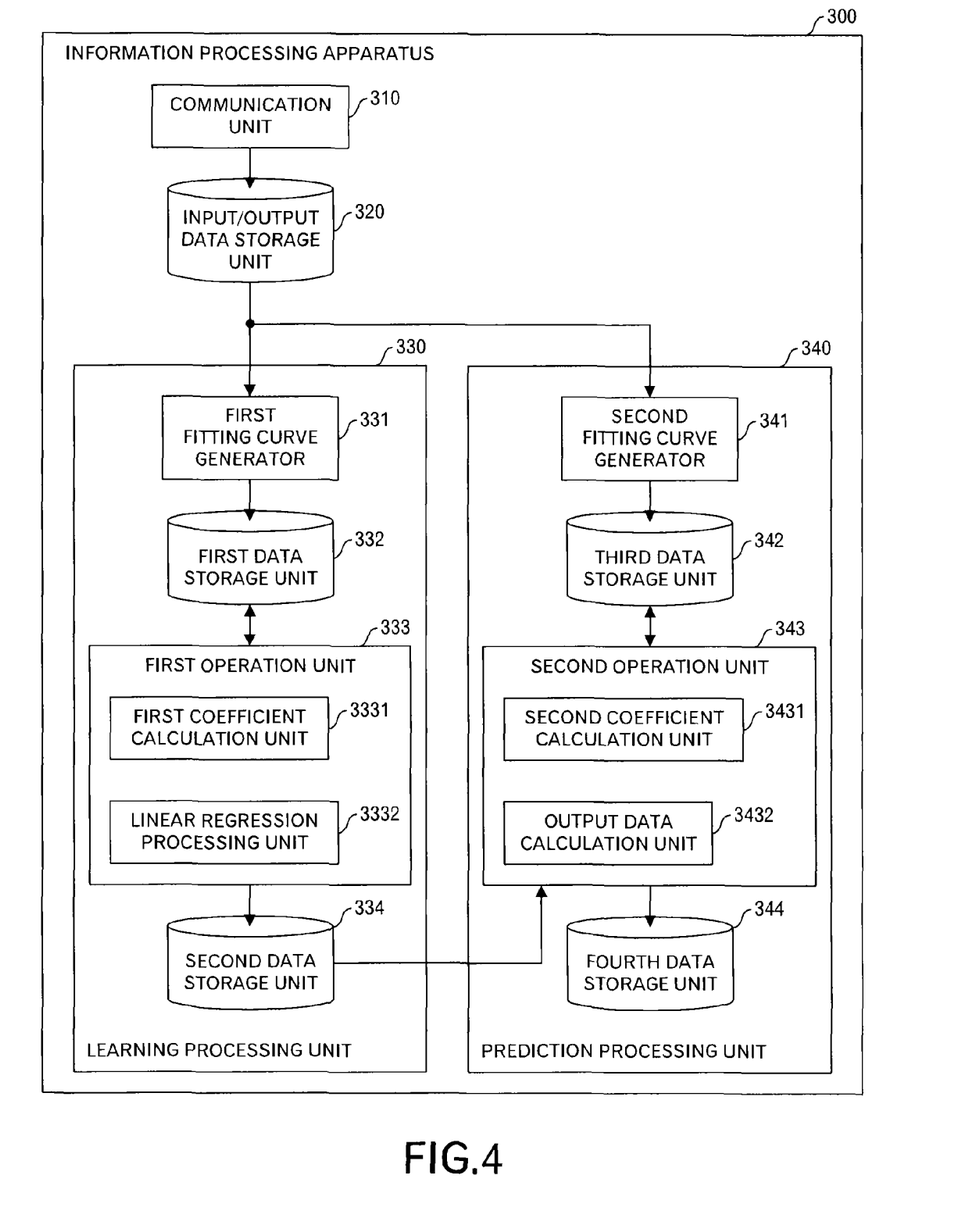
FIG. 4 is a functional block diagram of an information processing apparatus relating to the embodiments.

FIG. 4 illustrates a configuration example of the information processing apparatus 300.

The information processing apparatus 300 has a communication unit 310, an input/output data storage unit 320, a learning processing unit 330 and a prediction processing unit 340.

The communication unit 310 receives measurement data from the detection apparatus 100 in the vehicle 1000, and stores the received measurement data in the input/output data storage unit 320. The learning processing unit 330 performs a processing to identify the differential equations representing the vehicle 1000 from the digital inputs and digital outputs, and has a first fitting curve generator 331, a first data storage unit 332, a first operation unit 333 and a second data storage unit 334.

The first fitting curve generator 331 performs a Discrete Fourier Transformation (DFT) to generate a fitting curve for the digital inputs that are stored in the input/output data storage unit 320 and a fitting curve for the digital outputs that are stored in the input/output data storage unit 320, and stores data of those curves in the first data storage unit 332.

The first operation unit 333 has a first coefficient calculation unit 3331 and a linear regression processing unit 3332. The first coefficient calculation unit 3331 generates data used in the linear regression processing unit 3332 from data of the fitting curves, which is stored in the first data storage unit 332, and stores the generated data in the first data storage unit 332. The linear regression processing unit 3332 performs a linear regression processing by using data stored in the first data storage unit 332, and stores processing results in the second data storage unit 334. The processing results include the differential coefficients of the m-order differential operators. When the differential coefficients of the m-order differential operators are obtained, the differential equations that represent the vehicle 1000 will be obtained.

Moreover, the prediction processing unit 340 performs a processing to predict the digital outputs from new digital inputs and the identified differential equations, and has a second fitting curve generator 341, a third data storage unit 342, a second operation unit 343 and a fourth data storage unit 344.

The second fitting curve generator 341 performs a similar processing to the first fitting curve generator 331 to generate a fitting curve for the digital inputs stored in the input/output data storage unit 320, and stores data of that curve in the third data storage unit 342.

The second operation unit 343 has a second coefficient calculation unit 3431 and an output data calculation unit 3432. The second coefficient calculation unit 3431 calculates coefficients of an output function from the coefficients of the differential operators, which are stored in the second data storage unit 334, and data of the fitting curves, which is stored in the third data storage unit 342. The output data calculation unit 3432 calculates output data by the output function identified with the coefficients calculated by the second coefficient calculation unit 3431, and stores the output data in the fourth data storage unit 344.

Figure 5:
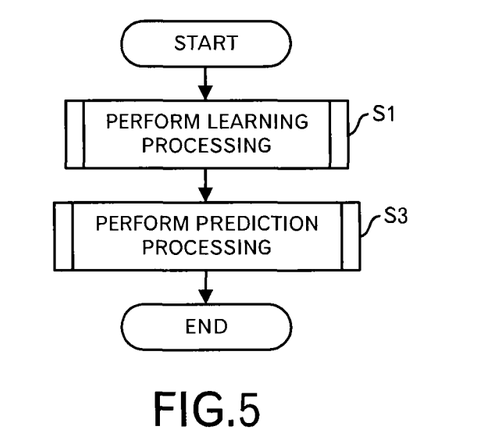
FIG. 5 is a diagram depicting a processing flow of a main processing relating to a first embodiment.

Next, processing contents of the information processing apparatus 300 will be explained. The learning processing unit 330 of the information processing apparatus 300 performs a learning processing that will be explained later (FIG. 5: step S1). The learning processing will be explained by using FIGS. 6 to 8 in detail. After that, the prediction processing unit 340 performs a prediction processing based on the learning result of the learning processing unit 330 (step S3). The prediction processing will be explained by using FIG. 9 in detail.

Next, the learning processing will be explained by using FIGS. 6 to 8. It is assumed that the communication unit 103 of the detection apparatus 100 in the vehicle 1000 transmits data of the digital inputs (e.g. measurement data of the accelerometer 101) and the digital outputs (e.g. measurement data of the distance sensor 102) at arbitrary timings, and the communication unit 310 of the information processing apparatus 300 stores received data from the vehicle 1000 in the input/output data storage unit 320.

Figure 6:
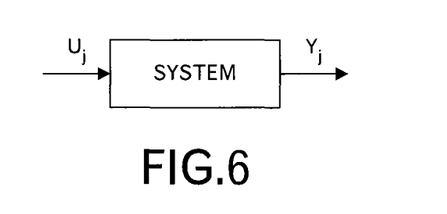
FIG. 6 is a diagram schematically depicting a system of the digital inputs and outputs.

More specifically, as illustrated in FIG. 6, it is assumed that outputs $Y_j$ (j=1 to l) of the system are obtained for the digital inputs $U_j$. $U_j$ and $Y_j$ include 2n+1 discrete points as described later.

$$U_j = (u_{j,0}, u_{j,1}, \ldots, u_{j,2n-1}, u_{j,2n}) j=1,2 \ldots l$$

$$Y_j = (y_{j,0}, y_{j,1}, \ldots, y_{j,2n-1}, y_{j,2n}) j=1,2 \ldots l$$

As described above, this system is represented by the differential equation $P(d/dt)y_j(t) = u_j(t)$ including the m-order differential operators $P(d/dt)$.

Figure 7:
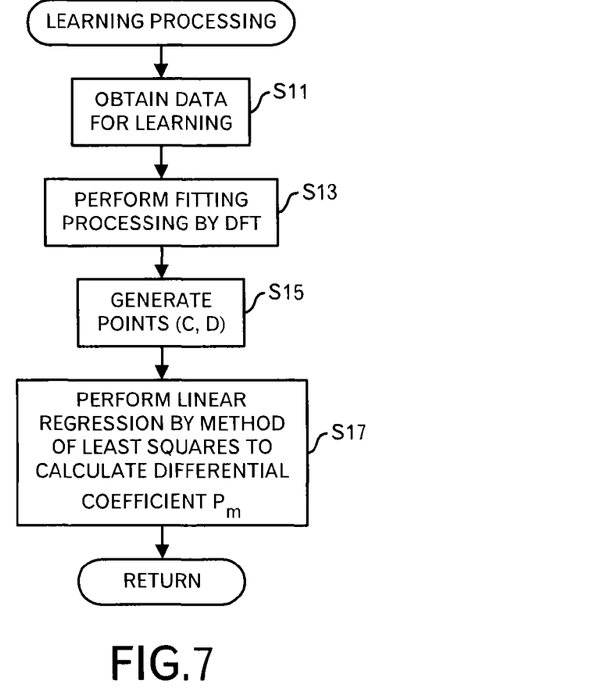
FIG. 7 is a diagram depicting a processing flow of a learning processing.
Figure 8:
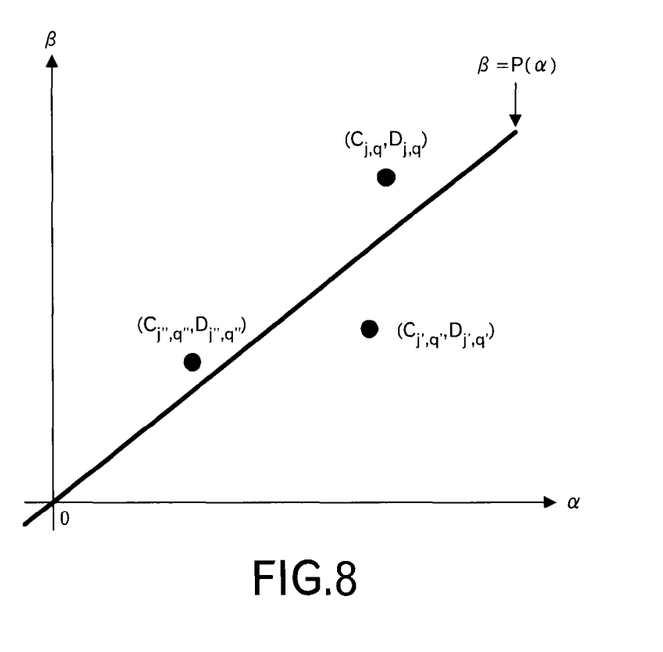
FIG. 8 is a diagram to explain a linear regression.

Then, the first fitting curve generator 331 of the learning processing unit 330 reads out $U_j$ and $Y_j$ from the input/output data storage unit 320 (FIG. 7: step S11). Then, the first fitting curve generator 331 generates a fitting curve $u_j(t)$ for the digital inputs $U_j$ and a fitting curve $y_j(t)$ for the digital outputs $Y_j$ by performing the fitting processing by the DFT for each j, and stores data of the curves in the first data storage unit 332 (step S13).

This fitting processing will be explained by using the digital outputs $Y_j$. However, the similar processing will be performed for the digital inputs $U_j$. Moreover, in order to make it easy to understand the explanation, "j" is omitted.

More specifically, the DFT is performed for real values $y_0$, $y_1$, ..., $y_{2n}$ of the discrete points to calculate n+1 frequencies. In other words, q=0, 1, ..., n.

$$Y_q = \sum_{i=0}^{2n} y_i e^{\frac{-2\sqrt{-1}\, qi\pi}{2n+1}} = \sum_{i=0}^{2n} y_i \left( \cos\frac{2qi\pi}{2n+1} - \sqrt{-1}\sin\frac{2qi\pi}{2n+1} \right)$$

Each frequency $Y_0, Y_1, \ldots, Y_n$ is complex number, and a real part $a_q$ and an imaginary part $b_q$ are represented as follows:

$$Y_0 = a_0 (b_0 = 0)$$

$$Y_q = a_q - \sqrt{-1} b_q\ q=0,1,\ldots,n$$

Because the discrete points are real values, please note $b_0 = 0$ from the characteristic of the DFT.

By using $a_q$ and $b_q$ obtained as described above, finite (i.e. n-order) Fourier series are generated as described below.

$$y(t) = \frac{1}{2n+1}a_0 + \frac{2}{2n+1}\sum_{q=1}^{n}\left(a_q\cos\frac{2q\pi}{2n+1}t + b_q\sin\frac{2q\pi}{2n+1}t\right) \quad (1)$$

The Fourier series obtained here are the fitting curve of the discrete points $y_0, y_1, \ldots, y_n$. This fitting curve passes through these discrete points as will be explained later.

When $2n+1$ discrete points $y_0, y_1, \ldots, y_{2n}$ are obtained, it is possible to obtain $2n+1$ frequencies by the DFT.

$$Y_q = \sum_{i=0}^{2n} y_i e^{-\frac{2\sqrt{-1}\,qi\pi}{2n+1}} = \sum_{i=0}^{2n} y_i\left(\cos\frac{2qi\pi}{2n+1} - \sqrt{-1}\sin\frac{2qi\pi}{2n+1}\right)$$

$$q = 0, 1, \ldots, 2n$$

When the discrete points are real values, following relations are obtained.

$$Y_q = \overline{Y}_{2n+1-q}$$

Y with a bar represents the complex conjugation of Y. According to this, following relations are also obtained.

$$a_q = a_{2n+1-q}\quad b_q = -b_{2n+1-q}\quad q = 0, 1, \ldots, 2n$$

Here, when an Inverse Discrete Fourier Transformation (IDFT) is performed in order to recover data of original discrete points from the frequencies $Y_0, Y_1, \ldots, Y_{2n}$, the IDFT is represented like a first line in the following expression.

$$(2n+1)y_i = \sum_{q=0}^{2n} Y_q e^{\frac{2\sqrt{-1}\,qi\pi}{2n+1}}$$

$$= Y_0 + \sum_{q=1}^{n} Y_q e^{\frac{2\sqrt{-1}\,qi\pi}{2n+1}} + \sum_{q=n+1}^{2n} \overline{Y}_{2n+1-q} e^{\frac{2\sqrt{-1}\,qi\pi}{2n+1}}$$

$$= Y_0 + \sum_{q=1}^{n} Y_q e^{\frac{2\sqrt{-1}\,qi\pi}{2n+1}} + \sum_{k=1}^{n} \overline{Y}_k e^{\frac{2\sqrt{-1}\,(2n+1-k)i\pi}{2n+1}}$$

$$= Y_0 + \sum_{q=1}^{n} \left(Y_q e^{\frac{2\sqrt{-1}\,qi\pi}{2n+1}} + \overline{Y}_q e^{-\frac{2\sqrt{-1}\,qi\pi}{2n+1}}\right)$$

$$= a_0 + \sum_{q=1}^{n} \left((a_q - \sqrt{-1}\,b_q)e^{\frac{2\sqrt{-1}\,qi\pi}{2n+1}} + (a_q - \sqrt{-1}\,b_q)e^{-\frac{2\sqrt{-1}\,qi\pi}{2n+1}}\right)$$

$$= a_0 + \sum_{q=1}^{n} \left(a_q\left(e^{\frac{2\sqrt{-1}\,qi\pi}{2n+1}} + e^{-\frac{2\sqrt{-1}\,qi\pi}{2n+1}}\right) - \sqrt{-1}\,b_q\left(e^{\frac{2\sqrt{-1}\,qi\pi}{2n+1}} - e^{-\frac{2\sqrt{-1}\,qi\pi}{2n+1}}\right)\right)$$

$$= a_0 + 2\sum_{q=1}^{n}\left(a_q\cos\left(\frac{2qi\pi}{2n+1}\right) + b_q\sin\left(\frac{2qi\pi}{2n+1}\right)\right)$$

$$i = 0, 1, \ldots, 2n$$

This second line represents that the right side of the first line is divided according to the aforementioned relationship between Y and its complex conjugation. In third and subsequent lines, a parameter q is adjusted and arrangement is advanced by representing the expression with the real part $a_q$ and imaginary part $b_q$ of the frequencies, and then, the last line is obtained.

On the other hand, when n-order Fourier series y(t), which are represented by the expression (1), are sampled at $t=0, 1, \ldots, 2n$, a following expression is obtained.

$$(2n+1)y_i(i) = a_0 + 2\sum_{q=1}^{n}\left(a_q\cos\left(\frac{2qi\pi}{2n+1}\right) + b_q\sin\left(\frac{2qi\pi}{2n+1}\right)\right) \quad (2)$$

$$i = 0, 1, \ldots, 2n$$

Because the right side of this expression (2) is equal to the last line of the expression of the Inverse Discrete Fourier Transformation, it is understood that $y_i=y(i)$ ($i=0, 1, \ldots, 2n$) holds. In other words, it is understood that the n-order Fourier series y(t) in the expression (1) pass through each of the original discrete points.

Moreover, when arbitrary n-order Fourier series g(t) are given and sampled at $t=0, 1, \ldots, 2n$ to obtain discrete points $g_i=g(i)$ ($i=0, 1, \ldots, 2n$), the fitting curve of the discrete points $g_i$ ($i=0, 1, \ldots, 2n$) is calculated, and the original g(t) is obtained again. This can be proved when a similar method to the aforementioned method is used, however, the detailed explanation is omitted here. As described above, this fitting method realizes one-to-one correspondence between the discrete points and finite Fourier series.

Therefore, the fitting curve $y_j(t)$ for the digital outputs and the fitting curve $u_j(t)$ for the digital inputs are obtained as described below.

$$y_j(t) = \frac{1}{2n+1}a_{j,0} + \frac{2}{2n+1}\sum_{q=1}^{n}\left(a_{j,q}\cos\frac{2q\pi}{2n+1}t + b_{j,q}\sin\frac{2q\pi}{2n+1}t\right)$$

$$j = 1, 2, \ldots, l$$

$$u_j(t) = \frac{1}{2n+1}\tilde{a}_{j,0} + \frac{2}{2n+1}\sum_{q=1}^{n}\left(\tilde{a}_{j,q}\cos\frac{2q\pi}{2n+1}t + \tilde{b}_{j,q}\sin\frac{2q\pi}{2n+1}t\right)$$

$$j = 1, 2, \ldots, l$$

Moreover, this fitting curve $y_j(t)$ and $u_j(t)$ can be represented by a sum of exponential functions whose base is the Napier's constant e. When the fitting curves can be represented by the sum of the exponential functions, it is possible to easily obtain the m-order differential.

$$y_j(t) = \frac{1}{2n+1}a_{j,0} + \frac{2}{2n+1}\sum_{q=1}^{n}\left(a_{j,q}\cos\frac{2q\pi}{2n+1}t + b_{j,q}\sin\frac{2q\pi}{2n+1}t\right) \quad (3)$$

$$= \sum_{q=-n}^{n} c_{j,q} e^{\frac{2\sqrt{-1}\,q\pi}{2n+1}t}$$

$$u_j(t) = \frac{1}{2n+1}\tilde{a}_{j,0} + \frac{2}{2n+1}\sum_{q=1}^{n}\left(\tilde{a}_{j,q}\cos\frac{2q\pi}{2n+1}t + \tilde{b}_{j,q}\sin\frac{2q\pi}{2n+1}t\right)$$

$$= \sum_{q=-n}^{n} d_{j,q} e^{\frac{2\sqrt{-1}\,q\pi}{2n+1}t}$$

$c_{j,q}$ and $d_{j,q}$ are represented as follows:

$$c_{j,q} = \tag{4}$$

$$\frac{a_{j,q} - \sqrt{-1}\,b_{j,q}}{2n+1}(q>0)c_{j,q} = \frac{a_{j,q} - \sqrt{-1}\,b_{j,q}}{2n+1}(q<0)c_{j,0} = \frac{a_{j,0}}{2n+1}$$

$$d_{j,q} =$$

$$\frac{\tilde{a}_{j,q} - \sqrt{-1}\,\tilde{b}_{j,q}}{2n+1}(q>0)d_{j,q} = \frac{\tilde{a}_{j,q} - \sqrt{-1}\,\tilde{b}_{j,q}}{2n+1}(q<0)d_{j,0} = \frac{\tilde{a}_{j,0}}{2n+1}$$

In this embodiment, the first fitting curve generator 331 generates a fitting curve by calculating coefficients $c_{j,q}$ and $d_{j,q}$ for each j (j=1 to l) and each q (q=−n to +n) according to the expressions (3) and (4). Those $c_{j,q}$ and $d_{j,q}$ are stored in the first data storage unit 332, for example.

Then, the first coefficient calculation unit 3331 of the first operation unit 333 generates plural points (C, D) on an αβ plane for calculating each differential coefficient of the m-th differential operator from the coefficients $c_{j,q}$ and $d_{j,q}$ (step S15).

As described above, because of $P(d/dt)y_j(t)=u_j(t)$, $P(d/dt)y_j(t)$ on the left side is represented as follows:

$$P\left(\frac{d}{dt}\right)y_j(t) = \sum_{q=-n}^{n} c_{j,q} P\left(\frac{2\sqrt{-1}\,q\pi}{2n+1}\right) e^{\frac{2\sqrt{-1}\,q\pi}{2n+1}t} \tag{5}$$

$$P(x) = x^m + P_1 x^{m-1} + \ldots + P_{m-1} x + P_m$$

$$j = 1, 2 \ldots l$$

As described above, $y_j$ is a sum of the exponential functions. Therefore, in case of the first-order differentiation, its coefficient becomes a coefficient of the exponent of the exponential function, in case of the second-order differential, its coefficient becomes (the coefficient of the exponent of the exponential function)$^2$, in case of the third-order differential, its coefficient becomes (the coefficient of the exponent of the exponential function)$^3$, and in case of the m-order differential, its coefficient becomes (the coefficient of the exponent of the exponential function)$^m$. Thus, the differential operation becomes very easy.

In other words, the expression is represented as follows:

$$P\left(\frac{d}{dt}\right)e^{\frac{2\sqrt{-1}\,q\pi}{2n+1}t} = \left(\frac{d}{dt}\right)^m e^{\frac{2\sqrt{-1}\,q\pi}{2n+1}t} + P_1\left(\frac{d}{dt}\right)^{m-1} e^{\frac{2\sqrt{-1}\,q\pi}{2n+1}t} + \ldots +$$

$$P_{m-1}\frac{d}{dt}e^{\frac{2\sqrt{-1}\,q\pi}{2n+1}t} + P_m e^{\frac{2\sqrt{-1}\,q\pi}{2n+1}t}$$

$$= \left\{ \left(\frac{2\sqrt{-1}\,q\pi}{2n+1}\right)^m + P_1\left(\frac{2\sqrt{-1}\,q\pi}{2n+1}\right)^{m-1} + \ldots + P_{m-1}\left(\frac{2\sqrt{-1}\,q\pi}{2n+1}\right) + P_m \right\} e^{\frac{2\sqrt{-1}\,q\pi}{2n+1}t}$$

$$= P\left(\frac{2\sqrt{-1}\,q\pi}{2n+1}\right) e^{\frac{2\sqrt{-1}\,q\pi}{2n+1}t}$$

Therefore, the aforementioned expression (5) is obtained.

Then, $P(d/dt)y_j(t)=u_j(t)$ is represented as follows:

$$\sum_{q=-n}^{n} c_{j,q} P\left(\frac{2\sqrt{-1}\,q\pi}{2n+1}\right) e^{\frac{2\sqrt{-1}\,q\pi}{2n+1}t} = \sum_{q=-n}^{n} d_{j,q} e^{\frac{2\sqrt{-1}\,q\pi}{2n+1}t} \tag{6}$$

$$j = 1, 2 \ldots l$$

Because each exponential function in the expression (6) is orthogonal, when the coefficient of each exponential function on the left side is identical to the coefficient of the same exponential function on the right side, the entire of the left side is identical to the entire of the right side. In other words, following relations are obtained.

$$c_{j,q} P\left(\frac{2\sqrt{-1}\,q\pi}{2n+1}\right) = \tag{7}$$

$$c_{j,q}\left(\frac{2\sqrt{-1}\,q\pi}{2n+1}\right)^m + c_{j,q}\left(\frac{2\sqrt{-1}\,q\pi}{2n+1}\right)^{m-1} P_1 + \ldots + c_{j,q} P_m = d_{j,q}$$

$$j = 1, 2 \ldots l$$

$$q = -n, \ldots, n$$

Here, because $d_{j,q}$ and $c_{j,q}(2\sqrt{(-1)}q\pi/(2n+1))^m$ are constant, they are moved to the right side, and terms of unknown differential coefficients $P_1$ to $P_m$ are moved to the left side. Therefore, a following expression is obtained.

$$c_{j,q}\left(\frac{2\sqrt{-1}\,q\pi}{2n+1}\right)^{m-1} P_1 + \ldots + c_{j,q}\left(\frac{2\sqrt{-1}\,q\pi}{2n+1}\right) P_{m-1} + c_{j,q} P_m = \tag{8}$$

$$d_{j,q} - c_{j,q}\left(\frac{2\sqrt{-1}\,q\pi}{2n+1}\right)^m$$

$$j = 1, 2 \ldots l$$

$$q = -n, \ldots, n$$

At the step S15, coefficients that are multiplied to unknown differential coefficients in this expression (8) are represented as a m-dimensional vector $C_{j,q}$, and a value of the constant term in the expression (8) is represented as $D_{j,q}$ as follows:

$$C_{j,q} =$$

$$\left( c_{j,q}\left(\frac{2\sqrt{-1}\,q\pi}{2n+1}\right)^{m-1}, c_{j,q}\left(\frac{2\sqrt{-1}\,q\pi}{2n+1}\right)^{m-2}, \ldots, c_{j,q}\left(\frac{2\sqrt{-1}\,q\pi}{2n+1}\right), c_{j,q} \right)$$

$$D_{j,q} = d_{j,q} - c_{j,q}\left(\frac{2\sqrt{-1}\,q\pi}{2n+1}\right)^m$$

$$j = 1, 2 \ldots l$$

$$q = -n, \ldots, n$$

Then, the linear regression processing unit 3332 calculates the differential coefficients $P_1$ to $P_m$ by performing the linear regression by the method of least squares for such points $(C_{j,q}, D_{j,q})$, and stores the differential coefficients in the second data storage unit 334 (step S17).

At this step, the unknown coefficients $P_1$ to $P_m$ of the regression line $\beta=P(\alpha)=\alpha_1 P_1 + \alpha_2 P_2 + \ldots + \alpha_{m-1} P_{m-1} + \alpha_m P_m$ are calculated. In other words, as schematically in FIG. 8, when the points explained at the step S17 are arranged on the αβ plane, the coefficients $P_1$ to $P_m$ that are included in β=P(α) for which the error is minimized are calculated. The method of least squares is well-known, therefore further explanation is omitted.

By performing the aforementioned processing, the differential coefficients of the differential operators are calculated so that the error is minimized and $P(d/dt)y_j(t) \approx u_j(t)$ is obtained.

As described above, the fitting curve is represented by the sum of the exponential functions. Therefore, it is possible to easily perform the higher-order differential, and it is also possible to perform the aforementioned processing at high speed.

Next, by using FIG. 9, the processing contents of the prediction processing will be explained.

After the learning processing is performed, the detection apparatus 100 of the vehicle 1000 transmits only measurement data of the accelerometer 101, in other words, data of the digital inputs from the communication unit 103 to the information processing apparatus 300. Accordingly, a transmission data amount to the information processing apparatus 300 is reduced. Here, instead of the digital inputs used in the learning processing, the measurement data of the accelerometer 101 as other digital inputs is newly obtained.

Therefore, when the communication unit 310 of the information processing apparatus 300 receives data of the digital inputs from the vehicle 1000, the communication unit 310 stores the received data in the input/output data storage unit 320.

Figure 9:
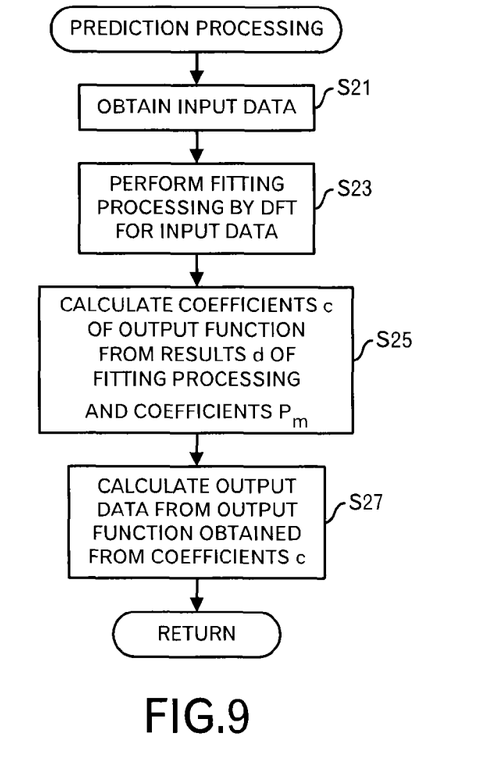
FIG. 9 is a diagram depicting a processing flow of a prediction processing.

Then, the second fitting curve generator 341 of the prediction processing unit 340 reads out the data of the digital inputs U (=($u_0, u_1, \ldots, u_{2n}$)) from the input/output data storage unit 320 (FIG. 9: step S21). Then, the second fitting curve generator 341 generates a fitting curve u(t) for the digital inputs U by the DFT, and stores data of the curve in the third data storage unit 342 (step S23). $d_q$ (q is −n to +n) in the expression (3) is calculated. Because there is only j=1, the suffix j is omitted.

Then, the second coefficient calculation unit 3431 of the second operation unit 343 uses the results $d_q$ of the fitting processing and the differential coefficients $P_1$ to $P_m$ of the differential operators, which are stored in the second data storage unit 334, to calculate coefficients $c_q$ (q is −n to +n) of the output function y(t) (step S25).

Specifically, $c_q$ is calculated by a following expression.

$$c_q = \frac{d_q}{P\left(\frac{2\sqrt{-1}\,q\pi}{2n+1}\right)}$$

Then, the output function y(t) is represented from the coefficients $c_q$ as follows:

$$y(t) = \sum_{q=-n}^{n} c_q e^{\frac{2\sqrt{-1}\,q\pi}{2n+1}t} \quad (9)$$

Therefore, the output data calculation unit 3432 calculates output data Y=($y_0, y_1, \ldots, y_{2n}$) for predetermined t (=0, 1, . . . , 2n) according to the expression (9), and stores the output data in the fourth data storage unit 344 (step S27).

Thus, it is possible to estimate a running distance by using the coefficients of the differential operators, which are obtained by the learning processing, and to output the estimated running distance.

Embodiment 2

Figure 10:
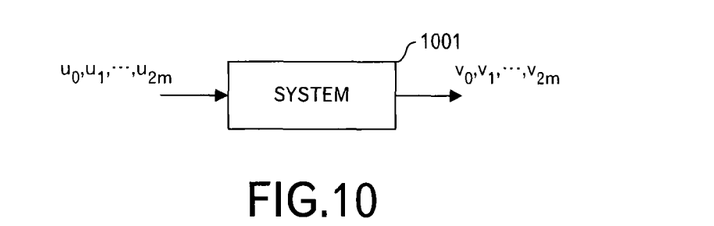
FIG. 10 is a diagram schematically depicting a system of digital inputs and outputs.

For example, as illustrated in FIG. 10, a case is considered that a system identification is performed when digital inputs $u_0, u_1, \ldots, u_{2m}$ and digital outputs $v_0, v_1, \ldots, v_{2m}$ are obtained. According to the first embodiment, a system 1001 in FIG. 10 is represented by using l-order differential operators P(d/dt) as follows:

$$P\left(\frac{d}{dt}\right)u(t) = v(t)$$

$$P\left(\frac{d}{dt}\right) = \left(\frac{d}{dt}\right)^l + P_1\left(\frac{d}{dt}\right)^{l-1} + \ldots + P_{l-1}\left(\frac{d}{dt}\right) + P_l$$

Here, u(t) is a fitting curve for the digital inputs $u_0, u_1, \ldots, u_{2m}$. v(t) is a fitting curve for the digital outputs $v_0, v_1, \ldots, v_{2m}$. In the second embodiment, in order to make it easy to understand the explanation, the suffix j of $u_j(t)$, $v_j(t)$ and $y_j(t)$ is omitted.

However, in the first embodiment, it is presumed that the number of discrete points included in the digital inputs and the number of discrete points included in the digital outputs are identical. In other words, it is presumed that the sampling intervals of the digital inputs and the sampling intervals of the digital outputs are identical in a section from t=0 to t=2m.

Figure 11:
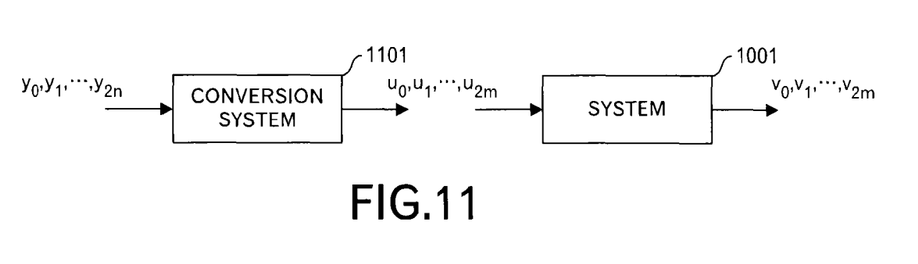
FIG. 11 is a diagram schematically depicting a system of digital inputs and outputs in a second embodiment.

On the other hand, in this embodiment, a conversion system 1101 as illustrated in FIG. 11 is introduced. The conversion system 1101 illustrated in FIG. 11 is a system to generate data of 2m+1 discrete points $u_0, u_1, \ldots, u_{2m}$ from the digital inputs $y_0, y_1, \ldots, y_{2n}$. When the conversion system 1101 is introduced, it is possible to perform the system identification from the digital inputs $y_0, y_1, \ldots, y_{2n}$ and the digital outputs $v_0, v_1, \ldots, v_{2m}$, even if n≠m.

Moreover, the conversion system 1101 is a system that not only can change the sampling intervals (i.e. change the number of discrete points) but also can change a type of data by the differential and integral (e.g. data of the speed is changed to data of the acceleration or data of the distance.). Then, in the second embodiment, the conversion system 1101 is defined by a following expression.

$$u(t) = \frac{d^p}{dt^p} y(t)\,(p = 0, 1, \ldots) \quad (10)$$

$$u(t) = \int y(t)dt$$

y(t) is a fitting curve for the digital inputs $y_0, y_1, \ldots, y_{2n}$. In this matter, the conversion system 1101 is a system to generate a curve u(t) by the differential and integral of the fitting curve y(t). When the fitting curve y(t) is generated by the method explained in the first embodiment, the differential and integral can be performed, easily. Specifically, the higher-order differential is possible, on the other hand, it is impossible when using the spline method. In case of p=0, u(t)=y(t) holds.

A system configuration to realize the conversion system 1101 is the same as that of the first embodiment. In the following, processing contents of the information processing apparatus 300 in the second embodiment will be explained by using FIG. 12. This processing is performed before the processing in FIG. 5, for example.

Figure 12:
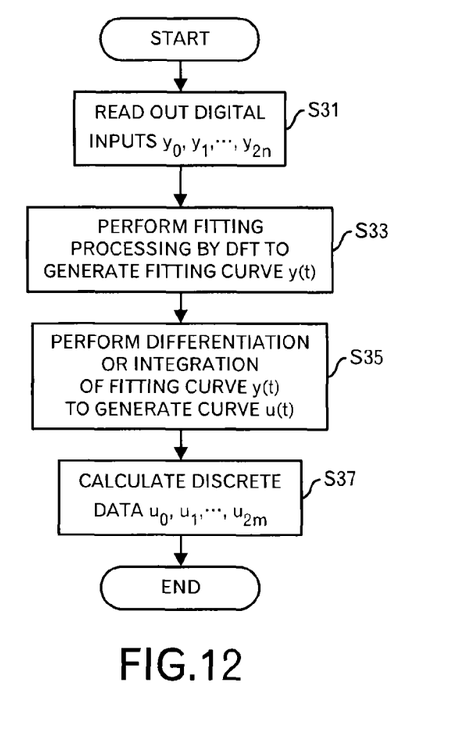
FIG. 12 is a diagram depicting a processing flow of a main processing relating to the second embodiment.

The communication unit 103 of the detection apparatus 100 in the vehicle 1000 transmits data of digital inputs (e.g. measurement data of the accelerometer 101) and digital outputs (e.g. measurement data of the distance sensor 102) to the information processing apparatus 300 at arbitrary timings. The communication unit 310 of the information processing apparatus 300 stores received data from the vehicle 1000 in the input/output data storage unit 320.

In the second embodiment, it is assumed that $y_0, y_1, \ldots, y_{2n}$ are received as the digital inputs, and $v_0, v_1, \ldots, v_{2m}$ are received as the digital outputs. Here, a case of $n \neq m$ may occur instead of $n=m$.

Then, the first fitting curve generator 331 in the learning processing unit 330 reads out the digital inputs $y_0, y_1, \ldots, y_{2n}$ from the input/output data storage unit 320 (FIG. 12: step S31).

The first fitting curve generator 331 generates a fitting curve $y(t)$ for the digital inputs $y_0 y_1, \ldots, y_{2n}$ by performing the fitting processing by the DFT (step S33), and stores data of the fitting curve $y(t)$ in the first data storage unit 332. At the step S33, the first fitting curve generator 331 performs the fitting processing by the DFT for each j, similarly to the first embodiment. However, as also described above, the description for j is omitted in order to simplify the explanation.

The processing of the step S33 is similar to the processing of the step S13 in the first embodiment. Therefore, the fitting curve $y(t)$ is represented as follows:

$$y(t) = \frac{1}{2n+1}a_0 + \frac{2}{2n+1}\sum_{q=1}^{n}\left(a_q\cos\frac{2q\pi}{2n+1}t + b_q\sin\frac{2q\pi}{2n+1}t\right) \quad (11)$$

The meanings of the variables and coefficients in the expression (11) are same as those in the first embodiment. And, as explained in the first embodiment, the right side of the expression (11) is represented by a sum of the exponential functions as follows:

$$y(t) = \sum_{q=-n}^{n} c_q e^{\frac{2\sqrt{-1}\,q\pi}{2n+1}t} \quad (12)$$

Then, the first fitting curve generator 331 performs differential or integral of the fitting curve $y(t)$, which is represented by the sum of the exponential functions, to generate a curve $u(t)$ (step S35). When the type of data is not changed, the differential is performed while assuming p=0.

Although the curve $u(t)$ is represented like the expression (10), the curve $u(t)$ is represented as follows when considering the expression (12).

$$u(t) = \frac{d^p}{dt^p}y(t) = \sum_{q=-n}^{n}\left(\frac{2\sqrt{-1}\,q\pi}{2n+1}\right)^p c_q e^{\frac{2\sqrt{-1}\,q\pi}{2n+1}t} \quad (13)$$

$$u(t) = \int y(t)dt$$

$$= \sum_{q=-n}^{-1}\left(\frac{2\sqrt{-1}\,q\pi}{2n+1}\right)^{-1} c_q e^{\frac{2\sqrt{-1}\,q\pi}{2n+1}t} + c_0 t +$$

$$\sum_{q=1}^{n}\left(\frac{2\sqrt{-1}\,q\pi}{2n+1}\right)^{-1} c_q e^{\frac{2\sqrt{-1}\,q\pi}{2n+1}t}$$

As described above, $y(t)$ is the sum of the exponential functions. Therefore, in case of the first-order differential, its coefficient becomes a coefficient of the exponent of the exponential function, in case of the second-order differential, its coefficient becomes (the coefficient of the exponent of the exponential function)$^2$, in case of the third-order differential, its coefficient becomes (the coefficient of the exponent of the exponential function)$^3$, and in case of the m-order differential, its coefficient becomes (the coefficient of the exponent of the exponential function)$^m$. Thus, the differential operation becomes very easy. Moreover, the higher-order differential is possible, although it is impossible in case of the spline method. Furthermore, typically, the integration of the exponential function $e^{kx}$ becomes $e^{kx}/k+C$ (k is a coefficient of the exponent and C is an integral constant), and the calculation is very easy. Therefore, it is also possible to perform the integral of the $y(t)$ plural times.

For example, when $y(t)$ is a fitting curve for the velocity, a curve $u(t)$ for the acceleration is obtained by performing the first-order differential, and a curve $u(t)$ for the distance is obtained by performing the integral. Moreover, when $y(t)$ is the fitting curve for the distance, a curve $u(t)$ for the velocity is obtained by performing the first-order differential, and a curve $u(t)$ for the acceleration is obtained by performing the second-order differential.

Then, the first fitting curve generator 331 calculates data of 2m+1 discrete points $u_0, u_1, \ldots, u_{2m}$ for the curve $u(t)$ generated at the step S35 (step S37), and stores the calculated data in the input/output data storage unit 320. Then, the processing ends.

Because 2m+1 discrete points are disposed in a section from t=0 to t=2n, data of the 2m+1 discrete points $u_0, u_1, \ldots, u_{2m}$ are as follows:

$$u_0 = u(0),\ u_1 = u\left(\frac{n}{m}\right),\ u_2 = u\left(\frac{2n}{m}\right),\ \ldots\ ,\ u_{2m-1} = u\left(\frac{n(2m-1)}{m}\right),$$

$$u_{2m} = u(2n)$$

The first fitting curve generator 331 can perform the system identification, which was explained in the first embodiment, by using the data of the 2m+1 discrete points $u_0, u_1, \ldots, u_{2m}$, which are stored in the input/output data storage unit 320, and data of the 2m+1 discrete points $v_0, v_1, \ldots, v_{2m}$.

When the aforementioned processing is performed, $y(t)$ and $u(t)$ are continuous functions. Therefore, it becomes possible to equate the sampling intervals for the digital inputs with the sampling intervals for the digital outputs. Moreover, because the differentiation (however, p≠0) and integration of the fitting curve $y(t)$ can be easily performed, it becomes possible to perform the system identification, analysis for data having a different type.

Although the embodiments of this invention were explained, this invention is not limited to those. For example, the explanation was made in which the accelerometer 101 and the distance sensor 102, which are provided in the vehicle 1000, are presumed, however, data measured by other sensors that correspond to inputs and outputs of a system to be identified may be employed.

Moreover, functional block diagrams illustrated in FIGS. 3 and 4 are mere examples, and do not correspond to program module configurations. Furthermore, as for the processing flow, as long as the processing results do not change, turns of the steps may be exchanged, and plural steps may be executed in parallel.

Furthermore, in FIGS. 3 and 4, the detection apparatus 100 and the information processing apparatus 300 are separately implemented, however, an apparatus that integrates them may be implemented depending on the usage. Furthermore, the detection apparatus 100 may be implemented in an apparatus such as a cellular phone or car navigation apparatus.

Furthermore, the embodiments can be applied not only to the system identification, but also to a learning problem of the artificial intelligence.

Figure 13:
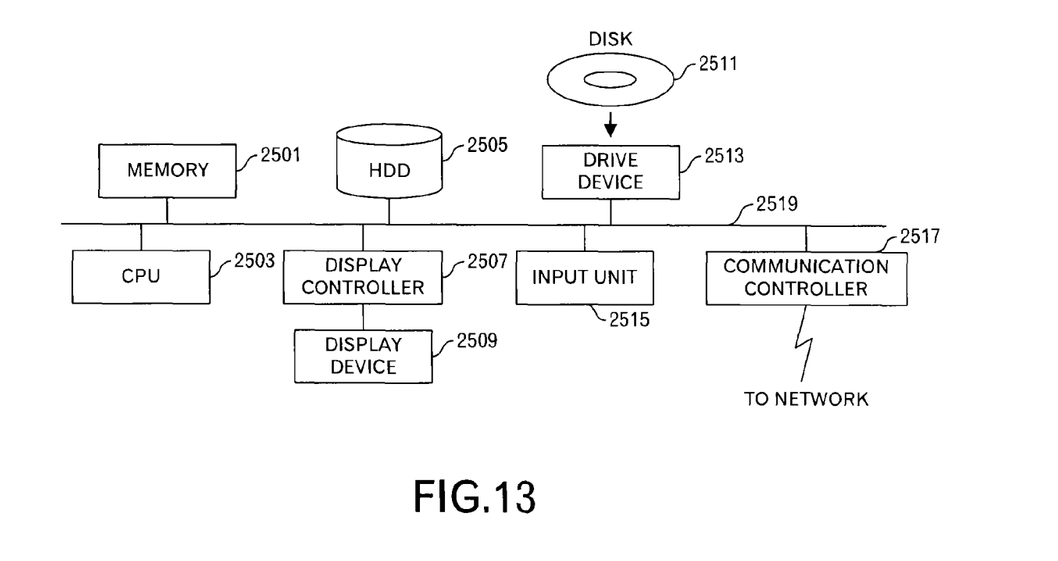
FIG. 13 is a functional block diagram of a computer.

In addition, the aforementioned information processing apparatus 300 is a computer device as shown in FIG. 13. That is, a memory 2501 (storage device), a CPU 2503 (processor), a hard disk drive (HDD) 2505, a display controller 2507 connected to a display device 2509, a drive device 2513 for a removable disk 2511, an input unit 2515, and a communication controller 2517 for connection with a network are connected through a bus 2519 as shown in FIG. 13. An operating system (OS) and an application program for carrying out the foregoing processing in the embodiment, are stored in the HDD 2505, and when executed by the CPU 2503, they are read out from the HDD 2505 to the memory 2501. As the need arises, the CPU 2503 controls the display controller 2507, the communication controller 2517, and the drive device 2513, and causes them to perform necessary operations. Besides, intermediate processing data is stored in the memory 2501, and if necessary, it is stored in the HDD 2505. In this embodiment of this technique, the application program to realize the aforementioned functions is stored in the computer-readable, non-transitory removable disk 2511 and distributed, and then it is installed into the HDD 2505 from the drive device 2513. It may be installed into the HDD 2505 via the network such as the Internet and the communication controller 2517. In the computer as stated above, the hardware such as the CPU 2503 and the memory 2501, the OS and the necessary application programs systematically cooperate with each other, so that various functions as described above in details are realized.

The aforementioned embodiments are outlined as follows:

An information processing method relating to the embodiments includes (A) generating a fitting curve represented by a sum of exponential functions for each of a set of digital inputs and a set of digital outputs for a physical system that is represented by one or plural equations including m-order differential operators (m is an integer equal to or greater than 1. The set of the digital inputs and the set of the digital outputs are stored in a data storage unit.); and (B) calculating coefficients of the differential operators, which are included in first coefficients, so that a first coefficient of each exponential function included in an expression obtained by a product of the differential operators and the fitting curve for the set of the digital inputs is equal to a second coefficient of the same exponential function, which is included in the fitting curve for the set of the digital outputs.

When the fitting curve is represented by a sum of exponential functions as described above, it is possible to easily differentiate the fitting curve even if m is higher-order, and it is also possible to easily obtain the coefficients of the differential operators. In other words, a calculation amount can be reduced as a whole, and it is possible to perform the system identification.

The aforementioned calculating may include: (b1) generating plural combinations of a third coefficient and a difference between the second coefficient and a constant term, for which a coefficient of the differential operators is not multiplied, among the first coefficients, wherein the third coefficient is a coefficient, for which a coefficient of the differential operators is multiplied, among the first coefficients; and (b2) performing linear regression calculation for the plural combinations to calculate the coefficients of the differential operators.

Accordingly, even when a lot of digital inputs and digital outputs are obtained, it is possible to obtain the coefficients of the differential operators with much less error.

Moreover, the aforementioned first coefficient may be a product of a value of the differential operator for a coefficient in an exponent of a first exponential function corresponding to the first coefficient and a coefficient of the same exponential function as the first exponential function, which is included in the fitting curve for the set of the digital inputs. The differential can be represented by such simple operations.

Furthermore, the aforementioned information processing method may further include: (C) generating a second fitting curve represented by a sum of exponential functions for a second set of digital inputs of the physical system; (D) calculating, for each exponential function of the second fitting curve, coefficients of an output function, which are obtained from a coefficient of the exponential function and a value of a differential operator, which includes the calculated coefficient of the differential operator for a coefficient in an exponent of the exponential function; and (E) calculating digital output values from the output function including the calculated coefficient of the output function. By performing the aforementioned processing, it becomes possible to predict the outputs of the identified system from the digital inputs.

Moreover, the aforementioned generating may include: (a1) generating the fitting curve for the set of the digital inputs by calculating n+1 frequencies by performing discrete Fourier transformation for 2n+1 digital inputs and generating n-order Fourier series from the n+1 frequencies, wherein n is an integer; and (a2) generating the fitting curve for the set of the digital outputs by calculating n+1 frequencies by performing discrete Fourier transformation for 2n+1 digital outputs and generating n-order Fourier series from the n+1 frequencies. By performing the aforementioned processing, it becomes possible to generate the fitting curve that can recover the original digital inputs and outputs, securely.

Moreover, the aforementioned generating may further include: (a3) calculating l+1 frequencies (l is an integer.) by performing discrete Fourier transformation for 2l+1 third digital inputs that are stored in the data storage unit, and generating l-order Fourier series from the l+1 frequencies to generate a third fitting curve represented by a sum of exponential functions for the third digital inputs; and (a4) calculating 2n+1 digital inputs from the generated third fitting curve, and storing the 2n+1 digital inputs into the data storage unit. When the aforementioned processing is performed, it is possible to perform the system identification even if the number of digital inputs stored in the data storage unit and the number of digital outputs are different each other.

Moreover, the aforementioned generating may include: (a5) generating a first curve by performing differential or integral for the fitting curve for the set of the digital inputs; and (a6) generating fourth digital inputs by using the generated first curve, and storing the fourth digital inputs into the data storage unit. Because the fitting curve for the set of digital inputs are represented by the sum of the exponential functions, it is possible to easily calculate the differential and integral. Then, when performing the aforementioned processing, it becomes possible to perform the system identification for data obtained by the differential or integral.

Incidentally, it is possible to create a program causing a computer to execute the aforementioned processing, and such a program is stored in a computer readable storage medium or storage device such as a flexible disk, CD-ROM, DVD-ROM, magneto-optic disk, a semiconductor memory such as ROM (Read Only Memory), and hard disk. In addition, the intermediate processing result is temporarily stored in a storage device such as a main memory or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. An information processing apparatus for prediction of system outputs, comprising:
    a memory; and
    a processor coupled to the memory and configured to:
        generate a first fitting curve represented by a sum of exponential functions for a set of first digital inputs measured by a first sensor and a second fitting curve represented by a sum of exponential functions for a set of first digital outputs measured by a second sensor, for a physical system that is represented by one or a plurality of equations including m-order differential operators, wherein m is an integer equal to or greater than 1;
        calculate coefficients of the differential operators, which are included in first coefficients, so that a first coefficient of each exponential function included in an expression obtained by a product of the differential operators and the first fitting curve for the set of the first digital inputs is equal to a second coefficient of a same exponential function, which is included in the second fitting curve for the set of the first digital outputs; and
        predict second digital outputs of the physical system based on an output function obtained from the second fitting curve and coefficients of the output function, which are calculated from the coefficients of the differential operators and second digital inputs of the physical system.

2. The information processing apparatus as set forth in claim 1, wherein the calculating comprises:
    generating a plurality of combinations of a third coefficient and a difference between the second coefficient and a constant term, for which a coefficient of the differential operators is not multiplied, among the first coefficients, wherein the third coefficient is a coefficient, for which a coefficient of the differential operators is multiplied, among the first coefficients; and
    performing linear regression calculation for the plurality of combinations to calculate the coefficients of the differential operators.

3. The information processing apparatus as set forth in claim 1, wherein the first coefficient is a product of a value of a differential operator for a coefficient in an exponent of a first exponential function corresponding to the first coefficient and a coefficient of a same exponential function as the first exponential function, which is included in the first fitting curve for the set of the first digital inputs.

4. The information processing apparatus as set forth in claim 1, wherein the predicting comprises:
    generating a third fitting curve represented by a sum of exponential functions for a set of the second digital inputs of the physical system;
    calculating, for each exponential function of the third fitting curve, a third coefficient of an exponential function in the output function, by using a coefficient of the exponential function and a value of a differential operator, which includes a coefficient of the differential operator for a coefficient in an exponent of the exponential function; and
    calculating digital output values from the output function including calculated third coefficients of the output function.

5. The information processing apparatus as set forth in claim 1, wherein the generating comprises:
    generating the first fitting curve for the set of the first digital inputs by calculating n+1 frequencies by performing discrete Fourier transformation for 2n+1 digital inputs and generating n-order Fourier series from the n+1 frequencies, wherein n is an integer; and
    generating the second fitting curve for the set of the first digital outputs by calculating n+1 frequencies by performing discrete Fourier transformation for 2n+1 digital outputs and generating n-order Fourier series from the n+1 frequencies.

6. The information processing apparatus as set forth in claim 5, wherein the generating comprises:
    calculating l+1 frequencies by performing discrete Fourier transformation for 2l+1 third digital inputs, and generate l-order Fourier series from the l+1 frequencies to generate a fourth fitting curve represented by a sum of exponential functions for the third digital inputs; and
    calculating the 2n+1 digital inputs from the generated fourth fitting curve.

7. The information processing apparatus as set forth in claim 1, wherein the generating comprises:
    generating a first curve by performing differential or integral for the first fitting curve for the set of the first digital inputs; and
    generating fourth digital inputs by using the generated first curve.

8. A non-transitory computer-readable storage medium storing a program that causes a computer to execute a process for prediction of system outputs, the process for the prediction of the system outputs comprising:
    generating a first fitting curve represented by a sum of exponential functions for a set of first digital inputs measured by a first sensor and a second fitting curve represented by a sum of exponential functions for a set of first digital outputs measured by a second sensor, for a physical system that is represented by one or a plurality of equations including m-order differential operators, wherein m is an integer equal to or greater than 1;

calculating coefficients of the differential operators, which are included in first coefficients, so that a first coefficient of each exponential function included in an expression obtained by a product of the differential operators and the first fitting curve for the set of the first digital inputs is equal to a second coefficient of a same exponential function, which is included in the second fitting curve for the set of the first digital outputs; and predicting second digital outputs of the physical system based on an output function obtained from the second fitting curve and coefficients of the output function, which are calculated from the coefficients of the differential operators and second digital inputs of the physical system.

9. An information processing method for prediction of system outputs, comprising:

generating, by using a computer, a first fitting curve represented by a sum of exponential functions for a set of first digital inputs measured by a first sensor and -a second fitting curve represented by a sum of exponential functions for a set of first digital outputs measured by a second sensor, for a physical system that is represented by one or a plurality of equations including m-order differential operators, wherein in is an integer equal to or greater than 1;

calculating, by using the computer, coefficients of the differential operators, which are included in first coefficients, so that a first coefficient of each exponential function included in an expression obtained by a product of the differential operators and the first fitting curve for the set of the first digital inputs is equal to a second coefficient of a same exponential function, which is included in the second fitting curve for the set of the first digital outputs; and predicting, by using the computer, second digital outputs of the physical system based on an output function obtained from the second fitting curve and coefficients of the output function, which are calculated from the coefficients of the differential operators and second digital inputs of the physical system.

* * * * *